L. J. KUNICK.
CHEESE CUTTING APPARATUS.
APPLICATION FILED OCT. 23, 1908.

938,063.

Patented Oct. 26, 1909.
2 SHEETS—SHEET 2.

Witnesses
Chas. C. Richardson
C. N. Woodward

Inventor
Leon J. Kunick,
By
Attorneys.

UNITED STATES PATENT OFFICE.

LEON J. KUNICK, OF RUTLAND, ILLINOIS.

CHEESE-CUTTING APPARATUS.

938,063.        Specification of Letters Patent.     Patented Oct. 26, 1909.

Application filed October 23, 1908. Serial No. 459,244.

*To all whom it may concern:*

Be it known that I, LEON J. KUNICK, a subject of the Czar of Russia, residing at Rutland, in the county of Lasalle, State of Illinois, have invented certain new and useful Improvements in Cheese-Cutting Apparatus; and I do hereby declare the following to be a full, clear, and exact description of the invention, such as will enable others skilled in the art to which it appertains to make and use the same.

This invention relates to cheese cutting devices, and has for one of its objects to improve the construction and increase the efficiency and utility of devices of this character.

Another object of the invention is to provide a simply constructed device of this character whereby the portion of the cheese to be severed is projected from one end of a casing and the remainder of the cheese protected within the casing until another portion is to be severed, the cheese to be projected only so fast as required.

With these and other objects in view the invention consists in a casing for supporting the cheese with a knife at one end and a mechanism at the other end for projecting the cheese as fast as it is required and arranged to be adjusted to project any predetermined quantity of the cheese into the path of the knife.

The invention further consists in a casing for supporting the cheese to be severed, a severing knife at one end of the casing, a screw operating in the casing beneath the cheese, a follower connected to the screw and disposed within the casing in the rear of the cheese, means for actuating said screw to cause the follower to travel through the casing and move the cheese into the path of the knife.

Figure 1:
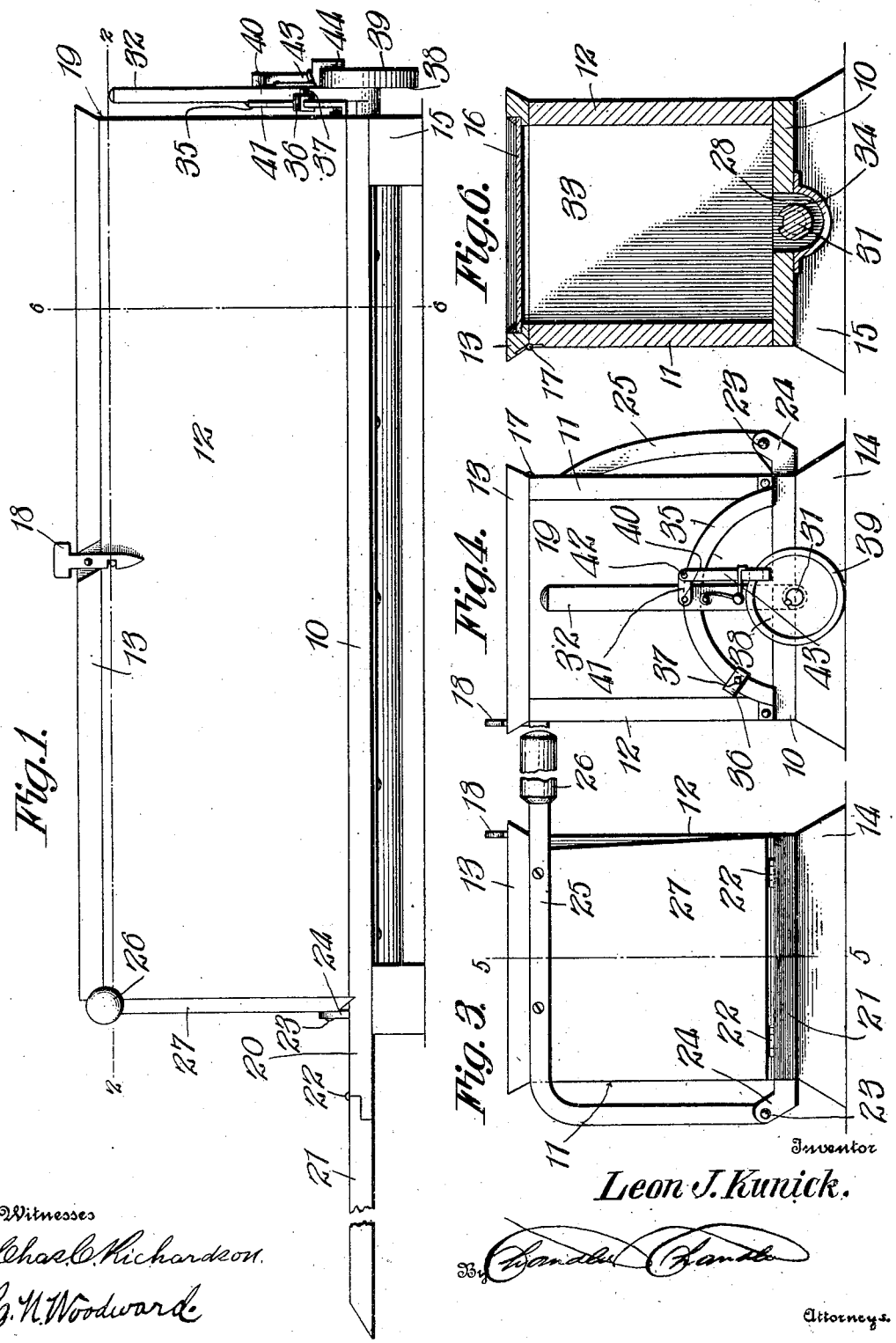
Figure 2:
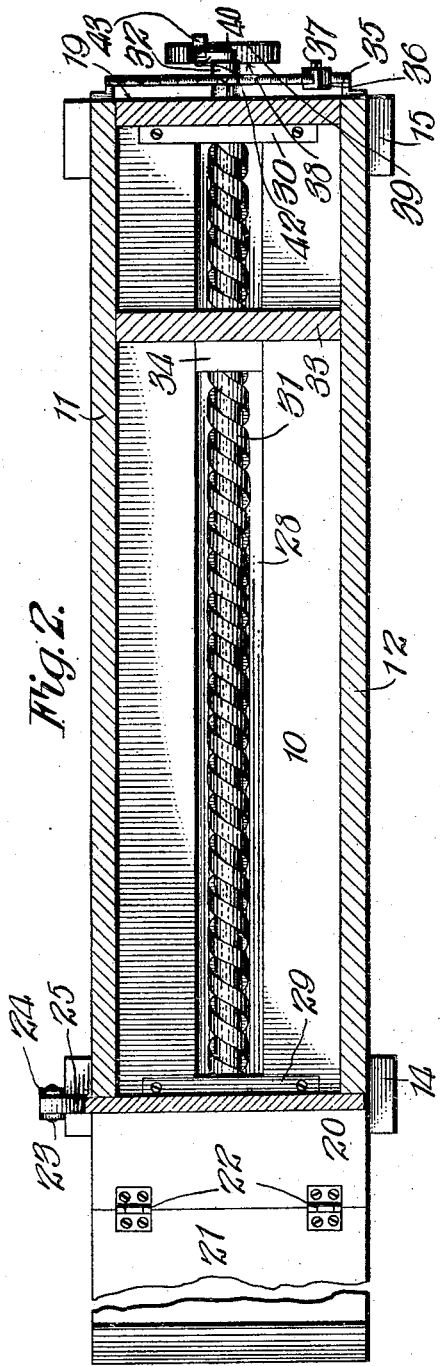
Figure 5:
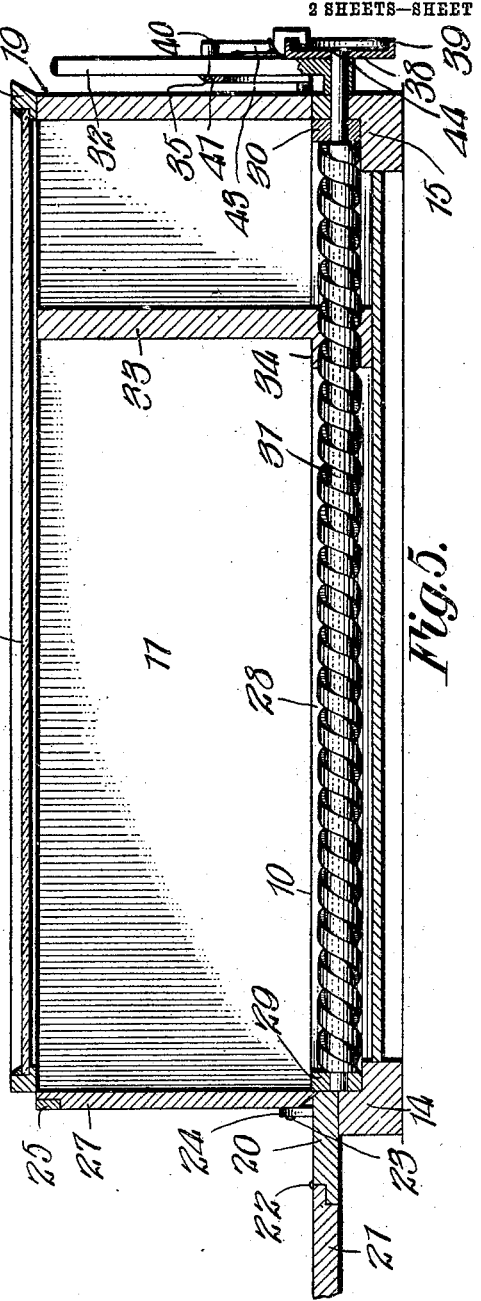

The invention further consists in certain novel features of construction as hereafter shown and described, and then specifically pointed out in the claims, and in the drawings illustrating the preferred embodiment of the invention, Figure 1 is a side elevation of the improved device. Fig. 2 is a plan view in the line 2—2 of Fig. 1. Fig. 3 is an end elevation from the knife end. Fig. 4 is an end elevation from the adjusting and operating end of the device. Fig. 5 is a longitudinal sectional elevation on the line 5—5 of Fig. 3. Fig. 6 is a transverse section on the line 6—6 of Fig. 1.

The improved device comprises a casing for receiving the cheese and formed with a base 10, spaced sides 11—12, and a top 13, the base supported by transverse cleats 14—15 and the top formed with a glass panel 16 and hinged at 17 to the side 11 and with a catch device 18 engaging the hinged top to the side 12.

One end of the casing at 19 is closed while the opposite end is open and the bottom member 10 extends beyond the open end of the casing at 20 and is provided with an upwardly folding extension member 21 hinged at 22 to the extension 20 to form a continuation of the bottom 10 and to receive the severed cheese, as hereafter explained.

Swinging at 23 to an arm 24 extending from the transverse member 14 is a curved arm or bar 25 having a handle 26 at one end and carrying the severing knife 27, the severing knife operating close to the end of the casing and transversely of the same and operating to sever the cheese as it is projected from the casing.

The bottom 10 of the casing is formed with a longitudinal slot 28, and mounted for rotation by bearings 29—30 adjacent to the end of the casing is a relatively large screw 31 preferably with a double thread, and provided with an operating lever 32 outside the end member 19 of the casing.

Slidably disposed within the casing is a follower member 33 having a depending portion 34 internally threaded and engaging the screw 31 so that the rotation of the screw will move the follower within the casing, the double threading of the screw providing for the rapid movement of the follower, as hereafter explained.

The bearings 29—30 are provided with caps bearing over their upper faces and engaging the journals of the screw 31, and supporting the screw in position for rotation, as will be obvious.

Connected to the closed end 19 of the casing is a segmental bar 35 having a stop 36 slidably disposed thereon and provided with a set screw 37 whereby the stop may be locked at any desired point upon the segment, the stop operating to limit the movement of the lever 32. The segment 35 is provided with graduations to represent pounds and fractions of pounds or other quantities of the cheese to be severed, as hereafter explained.

Connected to the screw 31 outside the end of the frame opposite to the cutting blade is a disk 38 having an annular rim 39. Pivoted at 40 to the lever 32 is an arm 41, and pivoted at 42 to the free end of the arm is a pawl member 43 having a lateral notch or recess 44 at its free end bearing over the annular rim 39 the pawl member 43 thus being maintained in spaced relations to the lever 32, so that when the lever is moved in one direction the notch 44 of the pawl member will move over the rim 39 without engaging therewith, but when the lever is moved in the opposite direction the notch will "pinch" or engage with the rim and thus rotate the screw 31 to which it is attached. A spring 45 is connected to the lever 32 and engages with the pawl 43 to maintain the same yieldably in one of its positions, and causes it to operate instantly when the lever is moved in one direction. By this simple means it will be obvious that when the lever is moved in one direction, it will have no effect upon the screw, but will rotate the screw when moved in the opposite direction.

The follower member 33 is disposed at the closed end of the casing and against the cheese arranged within the casing and against the inner face of the follower. When a portion of the cheese is required the stop 36 is adjusted at the point upon the segmental arm 35 corresponding with the amount to be severed and opened and disposed in longitudinal alinement with the bottom 10. The lever 32 is then actuated to rotate the screw 31 and force the follower forwardly in the casing a distance equal to the movement of the lever as controlled by the stop 36, this movement forcing a portion of the cheese through the open end of the casing and in the path of the knife, the amount of cheese forced from the casing corresponding, as above noted, to the position of the stop 36 upon the segment 35. The knife 27 is then actuated and the projecting portion of the cheese severed and deposited upon the folding member 21 from which it may be removed in any suitable manner. The knife 27 covering the whole open end of the casing forms a closure thereto and thus protects the cheese which remains in the casing. By this simple means any required predetermined quantity of the cheese may be projected and severed, the quantity being controlled by the position of the stop 36, as above noted.

The improved device is simple in construction, can be inexpensively manufactured, and of any required size, and will be employed more particularly for severing cheese, but it will be understood that the improved device may be employed for severing any product or article with which it is adapted to be employed, such as butter and like products.

The improved device is designed more particularly for severing Swiss cheese which is served to the trade in bricks of relatively square or oblong portions, and the casing will be formed to receive one or more bricks of the cheese.

The casing and other parts may be of any required size, but generally the casing will be about thirty-five inches long, nine and one-half inches high, and about nine inches wide, but these dimensions may be varied as required, and other changes may be made within the scope of the appended claims without departing from the principle of the invention or sacrificing any of its advantages.

What is claimed, is:—

1. A device of the class described comprising a casing closed at one end and open at the other end and provided with a longitudinal cavity in its lower side, a screw located within said cavity and having journals at the ends mounted for rotation in the casing, a follower movable in said casing and extending transversely of said cavity and the screw therein, means for coupling said follower to said screw, a disk provided with an annular projecting rim and secured to said screw, a lever arm swinging upon said screw, a spring actuated pawl carried by said lever and engaging the rim of said disk, a guide segment connected to said casing and adjacent to which said lever operates, a stop adjustably connected to said segment, and a knife operating over the open end of said casing.

2. A device of the class described comprising a casing closed at one end and open at the other end and provided with a longitudinal cavity in its lower side, a screw located within said cavity and having journals at the ends mounted for rotation in the casing, a follower movable in said casing and extending transversely of said cavity and the screw therein, means for coupling said follower to said screw, a lever swinging upon said screw, locking means between said lever and screw, a knife operating over the open end of the casing, and a folding extension to the floor of said casing.

3. A device of the class described comprising a casing, closed at one end and open at the other end, a follower movable in said casing, means for operating said follower, a knife operating over the open end of said casing, and an extension mounted to swing from the casing in a longitudinal plane with the bottom of the casing.

In testimony whereof, I affix my signature, in presence of two witnesses.

LEON J. KUNICK.

Witnesses:
   CLAUD QUAINTACE,
   VENESS COPP.